United States Patent
Shea (10) Patent No.: US 6,633,009 B1
(45) Date of Patent: Oct. 14, 2003

(54) SHORTING SWITCH AND SYSTEM TO ELIMINATE ARCING FAULTS IN LOW VOLTAGE POWER DISTRIBUTION EQUIPMENT

(75) Inventor: John J. Shea, Pittsburgh, PA (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 10/171,826

(22) Filed: Jun. 14, 2002

(51) Int. Cl.$^7$ .............................................. H01H 85/00
(52) U.S. Cl. ..................... 200/61.08; 361/111; 361/42
(58) Field of Search .............................. 200/61.08, 300; 361/56, 111, 112, 42, 43

(56) References Cited

U.S. PATENT DOCUMENTS

| | | | | |
|---|---|---|---|---|
| 4,339,638 | A | * | 7/1982 | Lascelles et al. ......... 200/61.08 |
| 4,433,607 | A | * | 2/1984 | Kemeny ........................... 89/8 |
| 5,510,946 | A | | 4/1996 | Franklin |
| 5,903,427 | A | | 5/1999 | Roby |
| 5,933,308 | A | | 8/1999 | Garzon |
| 5,940,547 | A | | 8/1999 | Schumacher et al. |
| 6,084,756 | A | * | 7/2000 | Doring et al. ................. 361/45 |
| 6,140,715 | A | | 10/2000 | Bernhoff et al. |
| 6,141,192 | A | | 10/2000 | Garzon |
| 6,229,680 | B1 | | 5/2001 | Shea |
| 6,239,514 | B1 | | 5/2001 | Isberg et al. |
| 6,535,369 | B1 | * | 3/2003 | Redding et al. ............ 361/111 |

OTHER PUBLICATIONS

Klockner–Moeller Ltd., "ARCON, Arc Fault Detection and Quenching System", 6 pgs.

UTU, "UTU Arc Protection Systems—a possibility to be protected", 4 pgs., Ulvila, Finland.

Garzon, R., "Arc Terminator An Alternative to Arc–Proofing", pp. 1–5, Square "D" Company, Smyrna, TN.

Square D Schneider Electric, "Arc–Terminator—Medium voltage arc–detection and arc–termination device", Power 2000, 9 pgs.

ABB Power Distribution, "ArcEliminator Rapid Elimination of Internal Arcing", 4 pgs., Arboga, Sweden.

Siemens, "Pressure Switch System 8AX10 For Medium Voltage Switchgear", 1 pg.

Berger, F. et al., "KurzschlieBer mit Gasgeneratorantrieb fur Storlichtbogenschutz", 4 pgs., Mar. 1999, Federal Republic of Germany.

Risi, "EBW Cable Cutter", 1 pg., San Ramon, CA.

RISI, "Technical Discussion on Explosives", 13 pgs.

* cited by examiner

Primary Examiner—Elvin Enad
Assistant Examiner—Marina Fishman
(74) Attorney, Agent, or Firm—Martin J. Moran (57) ABSTRACT

A shorting switch eliminates arcing faults in low voltage power distribution equipment. The switch includes a base supporting a first side and an opposite second side. A first end of a spring engages the first side of the base. A first end of a release bolt engages the first side of the base. An electrically activated, chemical charge is disposed in an opening of the release bolt to fracture that bolt. A bridging contact is biased by a second end of the spring toward the second side of the base. A second end of the release bolt normally holds the bridging contact and maintains the spring in a compressed state. Two contacts are supported by the second side of the base for electrical engagement by the bridging contact after fracture of the release bolt. Two terminals are respectively electrically connected to the two contacts.

21 Claims, 7 Drawing Sheets

SHORTING SWITCH AND SYSTEM TO ELIMINATE ARCING FAULTS IN LOW VOLTAGE POWER DISTRIBUTION EQUIPMENT

CROSS-REFERENCE TO RELATED APPLICATIONS

This application is related to commonly assigned, concurrently filed:

U.S. patent application Ser. No. 10/172,208, filed Jun. 14, 2002, entitled "Shorting Switch And System To Eliminate Arcing Faults In Power Distribution Equipment";

U.S. patent application Ser. No. 10/172,651, filed Jun. 14, 2002, entitled "Shorting Switch And System To Eliminate Arcing Faults In Power Distribution Equipment";

U.S. patent application Ser. No. 10/172,238, filed Jun. 14, 2002, entitled "Shorting Switch And System To Eliminate Arcing Faults In Power Distribution Equipment";

U.S. patent application Ser. No. 10/172,622, filed Jun. 14, 2002, entitled "Bullet Assembly For A Vacuum Arc Interrupter";

U.S. patent application Ser. No. 10/172,080, filed Jun. 14, 2002, entitled "Vacuum Arc Interrupter Having A Tapered Conducting Bullet Assembly";

U.S. patent application Ser. No. 10/172,209, filed Jun. 14, 2002, entitled "Vacuum Arc Interrupter Actuated By A Gas Generated Driving Force";

U.S. patent application Ser. No. 10/172,628, filed Jun. 14, 2002, entitled "Blade Tip For Puncturing Cupro-Nickel Seal Cup"; and U.S. patent application Ser. No. 10/172,281, filed Jun. 14, 2002, entitled "Vacuum Arc Eliminator Having A Bullet Assembly Actuated By A Gas Generating Device".

BACKGROUND OF THE INVENTION

1. Field of the Invention

The invention is directed to shorting switches and, in particular, to shorting switches for eliminating arcing faults in low voltage power distribution equipment. The invention is also directed to shorting systems for eliminating arcing faults in low voltage power distribution equipment.

2. Background Information

There is the potential for an arcing fault to occur across the power bus of a motor control center (MCC), another low voltage (LV) enclosure (e.g., an LV circuit breaker panel) and other industrial enclosures containing LV power distribution components. This is especially true when maintenance is performed on or about live power circuits. Frequently, a worker inadvertently shorts out the power bus, thereby creating an arcing fault inside the enclosure. The resulting arc blast creates an extreme hazard and could cause injury or even death. This problem is exacerbated by the fact that the enclosure doors are typically open for maintenance.

It is known to employ a high-speed shorting switch, placed between the power bus and ground, or from phase-to-phase, in order to limit or prevent equipment damage and personnel injury due to arc blasts. It is also known to employ various types of crowbar switches for this purpose. The switches short the line voltage on the power bus, eliminating the arc and preventing damage. The resulting short on the power bus causes an upstream circuit breaker to clear the fault.

Examples of medium voltage devices include a stored energy mechanism with vacuum interrupter contacts, and a mechanism to crush a conductor magnetically.

An example of a low voltage device is a stored energy air bag actuator, which drives a conductive member having a pin and a flange, in order to short two contacts. The first contact is in the form of a receptor for capturing the pin of the driven conductive member. The second contact has an opening, which allows the pin to pass therethrough, but which captures the flange of the driven member.

There is room for improvement in shorting switches and systems that respond to arcing faults and switch fast enough in order to protect workers and equipment from arc blasts associated with LV power distribution equipment.

SUMMARY OF THE INVENTION

These needs and others are met by the present invention, which provides a shorting switch for low voltage applications, which switches fast enough to protect personnel and equipment, while maintaining suitable electrical contact in order to eliminate subsequent arcing. The shorting switch employs a simple and low cost spring energy storage and fractured release member mechanism. The fractured release member actuates a spring-loaded contact, which then electrically engages two or more contacts. The spring has a suitably high force in order to maintain suitable contact force to prevent contact blow-apart and subsequent arcing.

As one aspect of the invention, a shorting switch for eliminating arcing faults in low voltage power distribution equipment comprises: a base supporting a first side and an opposite second side; a spring having a first end engaging the first side of the base, the spring also having a second end; a release member having an opening therein, the release member having a first end engaging the first side of the base, the release member also having a second end; a charge disposed in the opening of the release member, the charge for fracturing the release member; a bridging contact biased by the second end of the spring toward the second side of the base, the second end of the release member normally maintaining the spring in a compressed state; two contacts supported by the second side of the base for electrical engagement by the bridging contact after fracture of the release member; and two terminals respectively electrically connected to the two contacts.

As another aspect of the invention, a shorting switch for eliminating arcing faults in low voltage power distribution equipment comprises: a base supporting a first side and an opposite second side; a spring having a first end engaging the first side of the base, the spring also having a second end; a release member having an opening therein, the release member having a first end engaging the first side of the base, the release member also having a second end; a charge disposed in the opening of the release member, the charge for fracturing the release member; a bridging contact biased by the second end of the spring toward the second side of the base, the second end of the release member engaging the bridging contact to normally maintain the spring in a compressed state; at least three contacts supported by the second side of the base for electrical engagement by the bridging contact after fracture of the release member; and at least three terminals respectively electrically connected to the at least three contacts.

As another aspect of the invention, a shorting system for eliminating an arcing fault in low voltage power distribution equipment comprises: a base supporting a first side and an opposite second side; a spring having a first end engaging the first side of the base, the spring also having a second end; a release member having an opening therein, the release member having a first end engaging the first side of the base, the release member also having a second end; a charge disposed in the opening of the release member, the charge for fracturing the release member; a bridging contact biased by the second end of the spring toward the second side of the base, the second end of the release member normally maintaining the spring in a compressed state; two contacts supported by the second side of the base for electrical engagement by the bridging contact after fracture of the release member; two terminals respectively electrically connected to the two contacts; and means for detecting an arcing fault and responsively activating the charge disposed in the opening of the release member, in order that the activated charge fractures the release member, which releases the spring, which drives the bridging contact to short across the two contacts to eliminate the arcing fault.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
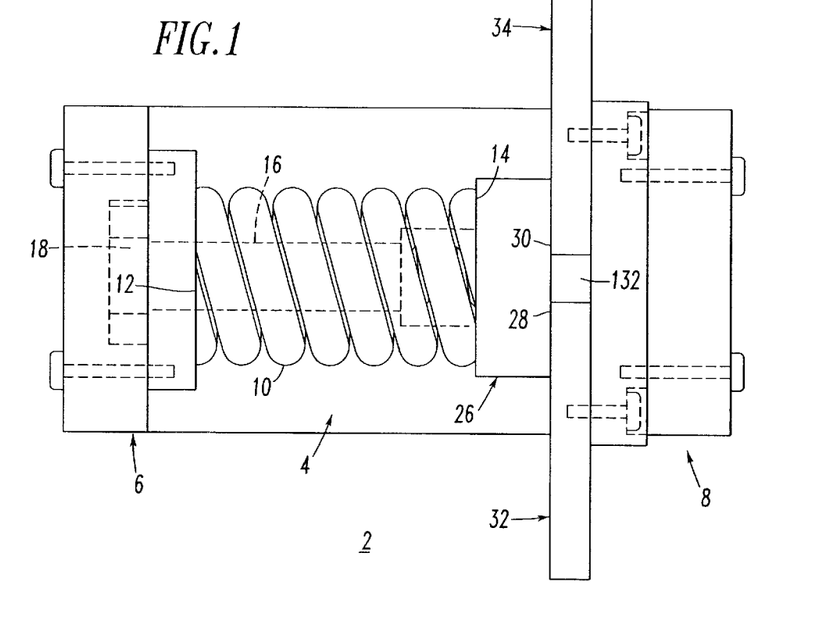
FIG. 1 is a plan view of a high-speed low voltage (LV) shorting switch including a spring mechanism, bridging contact, release bolt, contacts and terminals in accordance with the present invention.
Figure 2:
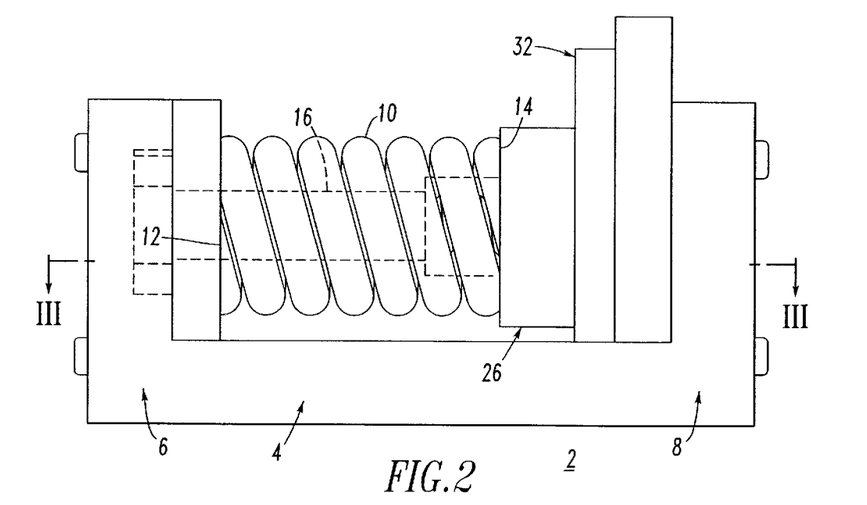
FIG. 2 is a side view of the high-speed LV shorting switch of FIG. 1.

Referring to FIGS. 1 and 2, a high-speed low voltage (LV) shorting switch 2 is illustrated. The exemplary shorting switch 2 advantageously eliminates arcing faults in LV power distribution equipment (not shown). The shorting switch 2 includes a base 4, which supports a first side 6 and an opposite second side 8. A spring mechanism, such as compression spring 10, has a first end 12 engaging the first side 6 of the base 4, and a second end 14.

Figure 3:
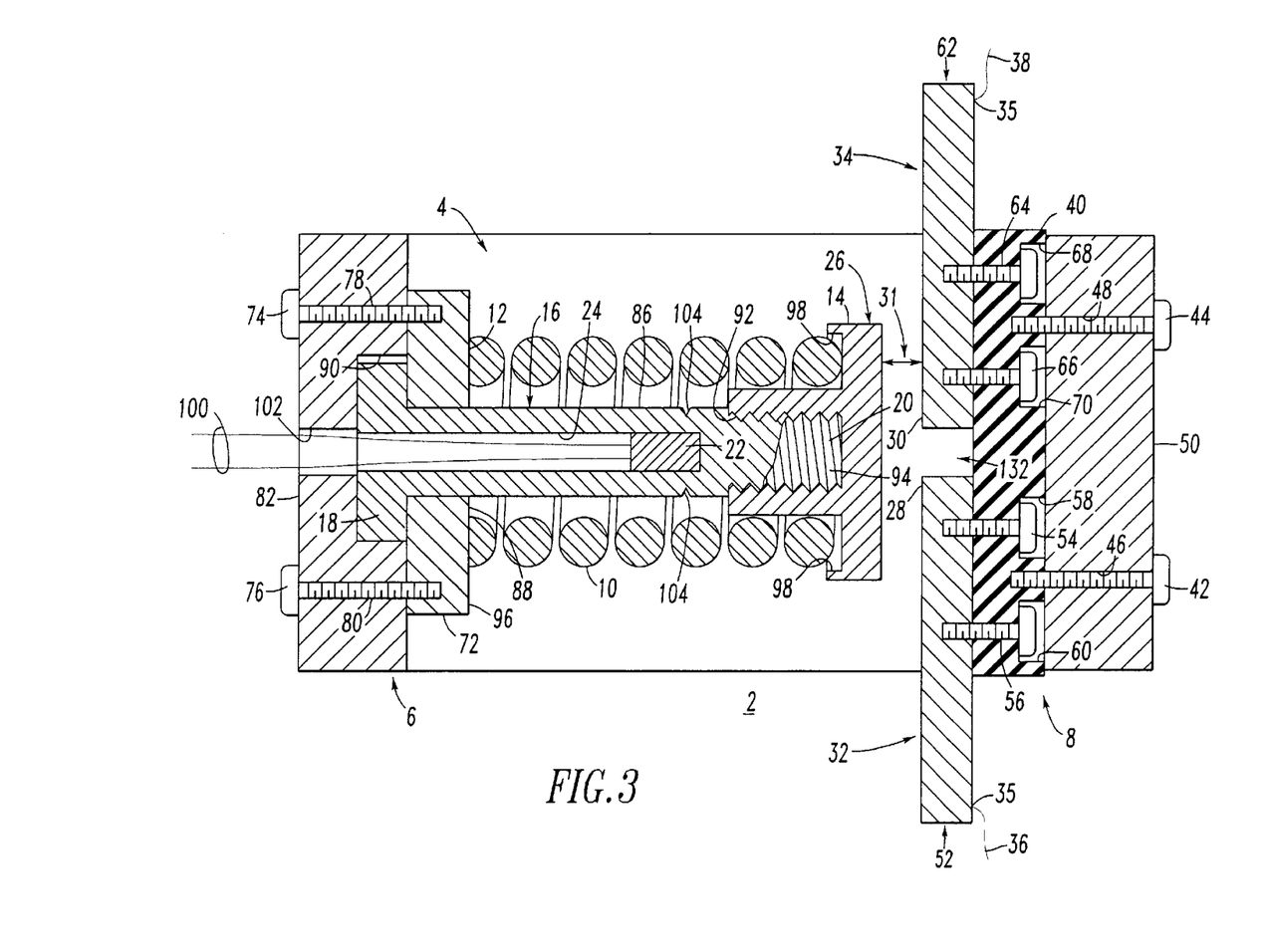
FIG. 3 is a cross-sectional view along lines III—III of FIG. 2.

As shown in FIG. 3, a release member, such as release bolt 16, has a first end 18 engaging the first side 6 of the base 4 and a second end 20. A charge 22 is disposed in an opening 24 of the release bolt 16. As discussed below in connection with FIGS. 3 and 4, activation of the charge 22 results in the fracture of the release bolt 16. A bridging contact 26 is biased by the second end 14 of the spring 10 toward the second side 8 of the base 4. Prior to activation of the charge 22, the second end 20 of the release bolt 16 holds the bridging contact 26 and normally maintains the spring 10 in a compressed state.

As best shown in FIGS. 1 and 3, two contacts 28,30 are supported by the second side 8 of the base 4 for electrical engagement (as shown in FIG. 1) by the bridging contact 26 after fracture of the release bolt 16. Otherwise, prior to fracture of the release bolt 16, a suitable gap 31 is disposed between the bridging contact 26 and contacts 28,30 when the spring 10 is compressed. Two terminals 32,34 (e.g., without limitation, power bus connections) are respectively electrically connected to the two contacts 28,30. As shown in FIG. 3, the two terminals 32,34 are adapted for electrical connection (e.g., by suitable electrical terminations 35) to two power lines 36,38, respectively. For example, the power lines 36 and 38 may respectively include a LV power line and a ground or neutral. After the charge 22 is activated and the release bolt 16 is fractured, the spring-loaded bridging contact 26, which was maintained by the release bolt 16, is released at a suitable high-speed, in order to short across the two contacts 28,30. The spring 10 forces the bridging contact 26 to electrically engage the contacts 28,30, thereby shorting the power lines 36 and 38, in order to effectively quench an arc. In turn, the short circuit is suitably cleared by an upstream circuit breaker (not shown) in the power circuit.

As best shown in FIG. 3, the exemplary base 4 is a steel block, although any suitable base structure (e.g., without limitation, an insulated box or tube (not shown), which encloses a spring mechanism, a bridging contact, a release bolt, and three corresponding terminals, each of which is attached to a corresponding bus in a three-phase system) and/or any suitable base material (e.g., conductive; non-conductive; magnetic; non-magnetic) may be employed. In the exemplary embodiment, a suitable insulator 40 is suitably secured by fasteners, such as screws 42,44, through respective openings 46,48 in one end 50 of the base 4 to form the second side 8 thereof.

Also, as shown in FIG. 3, the contact 28 and the terminal 32 are formed by a single conductive member 52, which is suitably secured by fasteners, such as screws 54,56, through respective recessed openings 58,60 in the insulator 40. Similarly, the contact 30 and the terminal 34 are formed by a single conductive member 62, which is suitably secured by fasteners, such as screws 64,66, through respective recessed openings 68,70 in the insulator 40. It will be appreciated that the insulator 40 is not required, and that an insulating base structure may be employed. As another alternative, only one of the conductive members 52,62 may be insulated from the base 4.

In the exemplary embodiment, a suitable member 72 is suitably secured by fasteners, such as screws 74,76, through respective openings 78,80 in the other end 82 of the base 4 to form the first side 6 thereof. Although a steel member 72 is shown, any suitable material (e.g., conductive; non-conductive; magnetic; non-magnetic) may be employed. The body 86 of the release bolt 16 passes through an opening 88 in the member 72. The head 18 of the release bolt 16 engages the member 72 and is received within an opening 90 of the end 82 of the base 4.

As best shown in FIG. 3, the bridging contact 26 has a threaded opening 92 which engagingly receives the threads 94 on the end 20 of the release bolt 16, thereby holding the bridging contact 26 at that end 20. In turn, the bridging contact 26 captures the spring 10 between the surface 96 of the member 72 at the spring end 12, and the receptive portion 98 of the bridging contact 26 at the opposite spring end 14.

The opening 24 of the release bolt 16 is a longitudinal cavity along the longitudinal axis thereof. The exemplary charge 22 is a small electrically activated, chemical charge, such as model number RP-501 made by Reynolds Industries Systems, Inc. (RISI). The RP-501 is a standard, end lighting, exploding bridge wire (EBW) detonator for use in general purpose applications (e.g., it is capable of detonating compressed TNT and COMP C-4). Although an exemplary detonator charge is employed, any suitable charge may be employed to fracture any suitable release member.

The charge 22 includes an electrical input, such as a pair of conductors 100, which pass through the opening 24 of the release bolt 16 and through an opening 102 of the base end 82. The charge 22 is suitably activated by an electrical signal on the conductors 100 to provide a shock wave to fracture the release bolt 16. Preferably, the release bolt body 86 has a breakline 104 disposed thereon with a predetermined depth in such body 86.

In the exemplary embodiment, the bolt body 86 has a 0.5-inch diameter and the bolt cavity 24 has a 0.295-inch diameter. The exemplary bolt 16 is 4.5 inches in length, with the cavity 24 being 2.0 inches deep from the bolt head 18, and the breakline 104 being 1.9 inches deep from the bolt head 18. The exemplary breakline 104 is employed to locate and control the fracture zone when the shock wave, created from the charge 22, fractures the metal release bolt 16.

Figure 4:
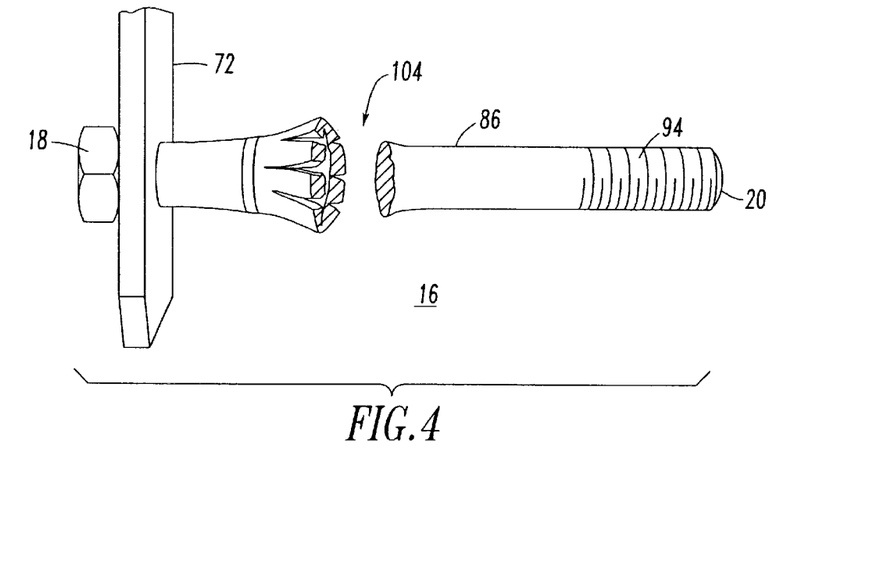
FIG. 4 is a plan view of the release bolt of FIG. 3, as fractured after the charge is activated.

The release bolt 16 is normally employed to compress the spring 10. After activation of the charge 22 inside the release bolt 16, the bolt fractures at or about the breakline 104 (as shown in FIG. 4), thereby releasing the bridging contact 26 and, thus, the spring 10. The spring 10 has a predetermined compression force. The release bolt 16 is structured to maintain the compressed state of the spring 10 until after the charge 22 is activated. In turn, the bridging contact 26, on the spring end 14, is moved thereby to close and hold closed the contacts 28,30. In the exemplary embodiment, the bridging contact 26 is held closed with a force of about 512 pounds across the contacts 28,30. This holding force prevents the contacts 28,30 from re-opening and vaporizing, while maintaining a suitably low contact resistance.

Figure 5:
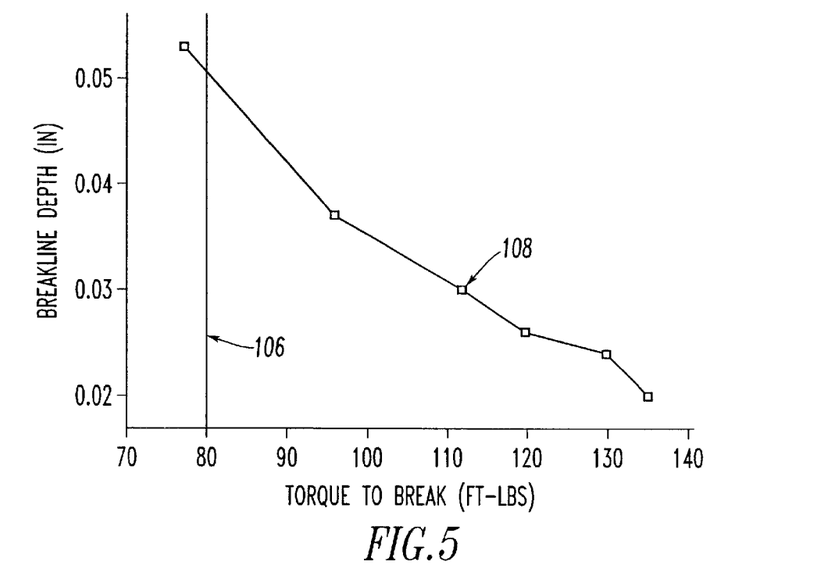
FIG. 5 is a plot of breaking torque versus breakline depth for the release bolt of FIG. 3.

FIG. 5 is a plot of breaking torque versus breakline depth for the release bolt 16 of FIG. 3. The vertical line 106 represents the minimum torque on the release bolt 16 suitable to fully compress the spring 10. The plot shows the maximum depth of the breakline 104 while still maintaining a spring force of 1200 pounds plus a suitable safety factor. The exemplary release bolt 16 is "grade 5" and can safely withstand a tensile stress of about 120,000 PSI without fracturing. An optimum breakline depth of about 0.025 inch or 0.03 inch at position 108 is preferably employed to reliably fracture the exemplary bolt 16 with the exemplary charge 22 and still allow the spring 10 to be compressed solid and held with a suitable safety margin.

Figure 6:
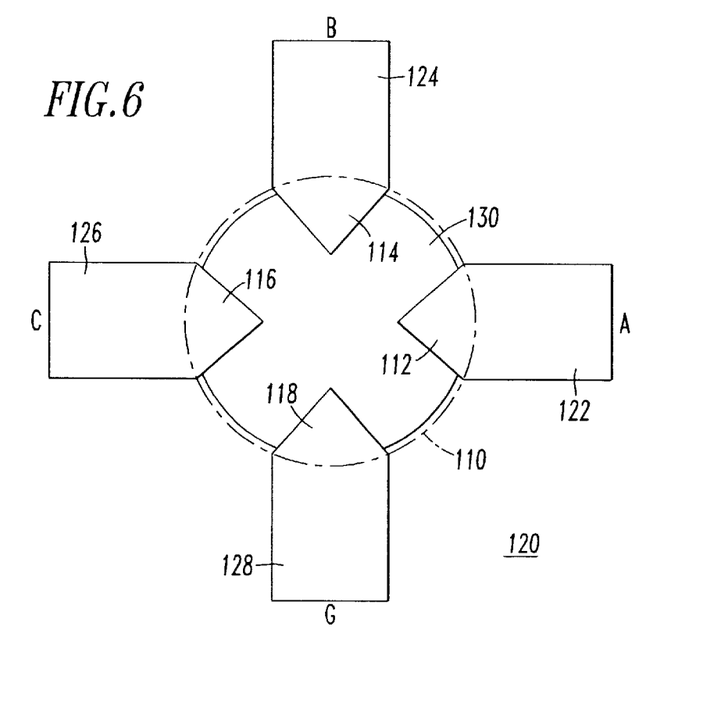
FIG. 6 is a plan view of a bridging contact engaging four contacts of a three-phase plus ground LV shorting switch in accordance with another embodiment of the invention.

Although the exemplary shorting switch 2 electrically connects two terminals 36,38 by the bridging contact 26, the invention is applicable to other applications, such as three, four or more terminals being electrically connected by a bridging contact. Such applications may include, for example, shorting switches for three phases to ground, three phases to neutral, three phases shorted together, two power legs to ground, and two power legs to neutral. For example, FIG. 6 shows a bridging contact 110 (shown in phantom line drawing) engaging four contacts 112,114,116,118 of a shorting switch 120. The shorting switch 120 is similar to the shorting switch 2 of FIG. 1, except that it has four contacts and four corresponding terminals 122,124,126,128 for three phases (A,B,C) and ground (G). Preferably, the contacts 112,114,116,118 have a gap therebetween and a solid insulator 130 is disposed within the gap. In a similar fashion, a suitable solid insulator (e.g., thermal set polyester; a thermal plastic, such as Delrin or Nylon) (not shown) may be disposed within the rectangular gap 132 between the contacts of 28,30 of FIGS. 1 and 3. Such insulation increases the over air creepage distance and, thus, permits the bus contacts 28,30 to be positioned closer to each other.

Figure 7:
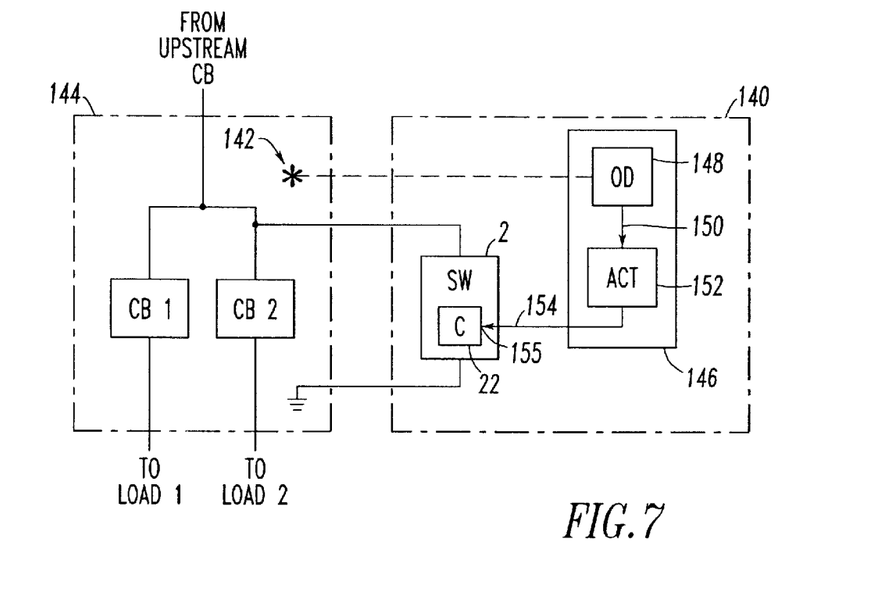
FIG. 7 is a block diagram of a shorting system including the shorting switch of FIG. 1.

FIG. 7 shows a shorting system 140 including one or more shorting switches 2 (only one switch (SW) 2 is shown in FIG. 7) of FIG. 1. The shorting system 140 eliminates an arcing fault 142 in low voltage power distribution equipment 144. The shorting system 140 also includes a detection and activation circuit 146 for detecting the arcing fault 142 and responsively activating the shorting switch charge (C) 22, in order that the activated charge 22 results in the elimination of the arcing fault as discussed above in connection with FIGS. 1–3. The circuit 146 includes a detection (OD) circuit 148 for detecting the arcing fault 142 and responsively outputting one or more trigger signals 150, and an activation circuit (ACT) 152 for detecting the one or more trigger signals 150 and responsively outputting the activation signal 154 to the electrical inputs 155 of the charges 22.

Figure 8:
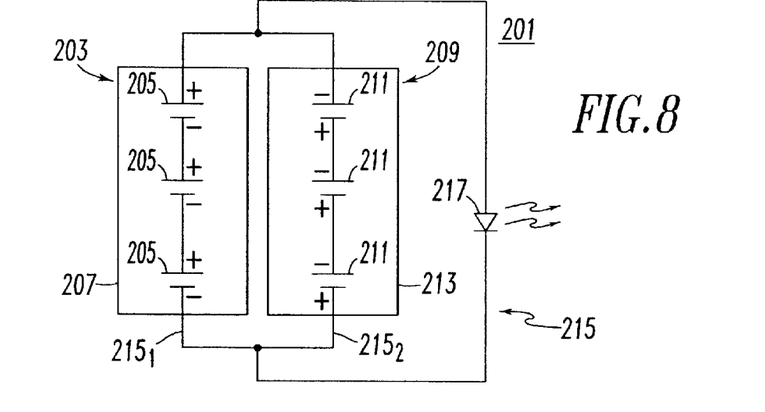
FIG. 8 is a schematic diagram of a sensor suitable for use with the shorting switch of FIG. 1.

The detection circuit 148 utilizes photovoltaic cells in a sensor unit. One form of the sensor unit 201 is illustrated in FIG. 8. The sensor unit 201 includes the first photovoltaic device 203 including at least one, or a plurality of series connected photovoltaic cells 205, and a first filter 207 which filters light incident upon the photovoltaic cells 205. This first filter 207 has a passband centered on the characteristic wavelength, e.g., 521.820 nm, of the arcing material.

The sensor 201 includes a second photovoltaic device 209, which also includes one or more series connected photovoltaic cells 211, and a second filter 213 which filters light incident upon the photovoltaic cells 211 and has a passband that does not include the characteristic wavelength of the arcing material, e.g., centered on about 600 nm in the exemplary system.

The first photovoltaic device 203 generates a sensed light electrical signal in response to the filtered incident light, and similarly, the second photovoltaic device 209 generates a background light electrical signal with an amplitude dependent upon the irradiance of light in the passband of the second filter 213. An electric circuit 215, having a first branch $215_1$ connecting the first photovoltaic cells 203 in series and a second branch $215_2$ similarly connecting the second photovoltaic cells 211 in series, connects these two electrical signals in opposition to a light-emitting device such as a light-emitting diode (LED) 217. When arcing is present, the sensed light electrical signal generated by the first photovoltaic device 203 exceeds the background light electrical signal generated by the second photovoltaic device 209 by a threshold amount sufficient to turn on the LED 217. While in the absence of arcing, the first photovoltaic device 203 will generate a sensed light electrical signal due to some irradiance in the passband of the first filter 207, it will be insufficient to overcome the reverse bias effect of the background light signal generated by the second photovoltaic device 209 on the LED 217. In fact, where the background light is fluorescent, from an incandescent bulb or a flashlight all of which have lower irradiance in the passband of the first filter 207, but higher irradiance in the passband of the second filter 213, the background light electrical signal will significantly exceed the sensed light electrical signal and strongly reverse bias the LED 217. The filters 207 and 213 can be interference filters, although lower cost bandpass filters could also be utilized.

Figure 9A:
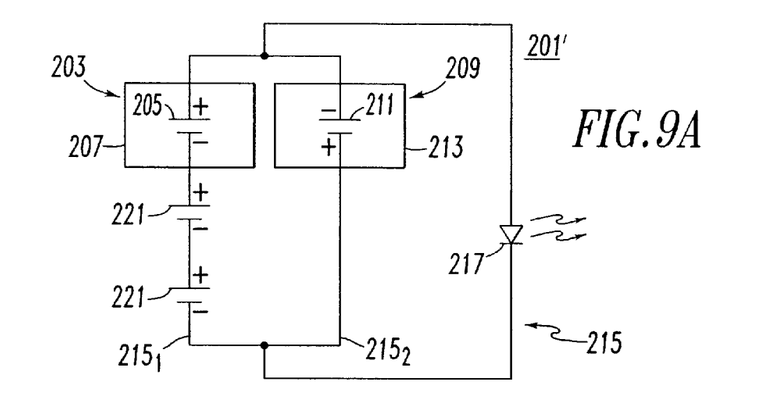
FIG. 9A is a schematic diagram of another sensor suitable for use with the shorting switch of FIG. 1.

An alternate embodiment of the sensor unit 201' shown in FIG. 9A adds a bias generator 219 in the form of one or more additional photovoltaic cells 221 connected in series with the first photovoltaic device 203 in the first branch 215$_1$ of the electrical circuit 215. This puts a forward bias on the LED 217 so that fewer or smaller filtered photovoltaic cells 205 and 211 can be used. This also reduces the size and therefore the cost of the filters 207 and 213. As the additional photovoltaic cells 221 are not provided with filters, the total cost of the sensor is reduced. The embodiment of FIG. 9A can be modified as shown in FIG. 9B to place the bias generating cells 221 of the sensor 201" in series with both filtered photovoltaic cells 205 and 211, but still provide the same effect of forward biasing the LED 217.

Figure 9B:
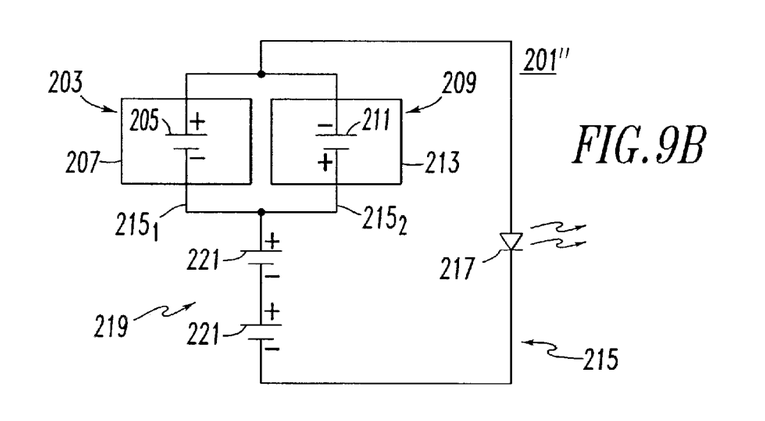
FIG. 9B is a schematic diagram of a modified form of the sensor of FIG. 9A.

Through their utilization of photovoltaic cells 205, 211 and 221, the sensors 201 and 201' of FIGS. 8 and 9A–9B are self-energized.

Figure 10:
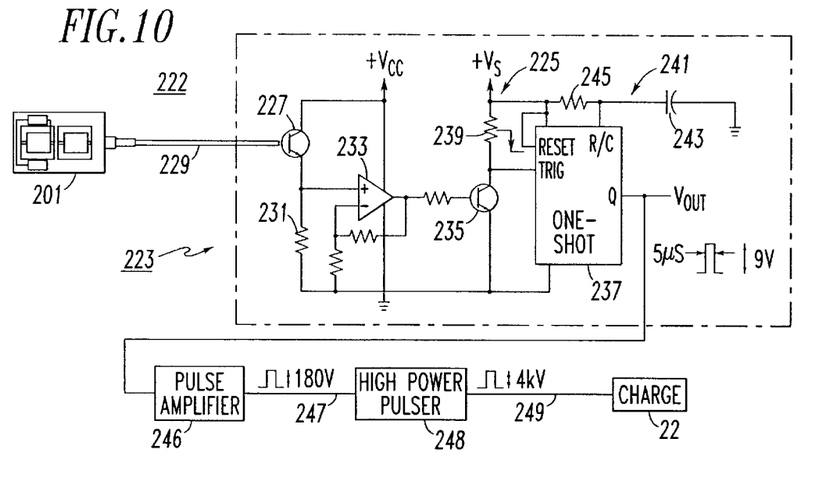
FIG. 10 is a schematic diagram of sensor electronics suitable for use with the shorting switch of FIG. 1.

FIG. 10 illustrates an example of an arcing fault detector 222. The sensor unit 201 (or 201') is connected to a response device 223, which includes a photoelectric circuit 225. This photoelectric circuit includes a photo diode 227, which is activated by the light signal generated by the sensor 201. The light signal is transmitted from the sensor 201 to the photo detector 227 by an optic fiber 229. This permits the photoelectric circuit 225 to be remotely located from the component being monitored where the arcing fault detector is used, for instance, in switchgear. This removes the photoelectric circuit 225 from the vicinity of voltages that could otherwise produce electromagnetic interference in the electronics. Thus, the optic fiber 229 provides electrical isolation for the photoelectric circuit 225. As the light signal generated by the sensor 201 is essentially a digital signal, that is it is on when an arcing fault is detected and off in the absence of arcing, a low-cost optic fiber is suitable for performing the dual functions of transmitting this digital optical signal and providing electrical isolation for the photo-electric circuit 225.

The photodetector 227 is energized by a suitable DC supply voltage such as +V$_{cc}$. The light signal generated by the LED 217 in the presence of arcing turns on the photo detector 227, which causes current to flow through the resistor 231. The voltage across this resistor 231 generated by the current is amplified by the op amp 233 sufficiently to turn on a transistor 235. The transistor 235 provides the trigger signal to a one-shot multi-vibrator 237. Normally, the transistor 235 is off so that a pull-up resistor 239 applies +V$_s$ to the trigger input of the one-shot multi-vibrator 237. When the sensor provides a light signal through the optic fiber 229 to turn on the photodetector 227, the transistor 235 is turned on pulling the trigger input of the one-shot multi-vibrator 237 essentially down to ground. This causes the output Q of the multi-vibrator V$_{out}$ to go high. An RC circuit 241 formed by the capacitor 243 and resistor 245 resets the one-shot multi-vibrator 237 to go low again so that V$_{out}$ is a pulse signal. The arcing fault signal represented by V$_{out}$ can be used to set an alarm, and/or trip a circuit breaker, or otherwise trigger the charge 22 of the shorting switch 2 or initiate a notification action. The time constant of the RC circuit 241 is selected to produce a pulse of sufficient duration to actuate the desired output device.

The output Q of the multi-vibrator 237 provides a trigger pulse V$_{out}$ of suitable amplitude (e.g., about 9 V) and duration (e.g., about 1 to 10 $\mu$s; about 5 $\mu$s) and is electrically connected to a pulse amplifier 246. The output of the pulse amplifier 246, which provides a suitable amplitude (e.g., about 180 V), is electrically connected by a suitable coaxial cable (e.g., RG-58) 247 to a high power pulser 248. The exemplary pulser 248 is a Model 619 made by Cordin Company of Salt Lake City, Utah. The output of the pulser 248, which provides a suitable amplitude (e.g., about 4000 V), is electrically connected by a suitable coaxial cable (e.g., RG-8) 249 to the charge 22 of the shorting switch 2 of FIG. 1.

Figure 11:
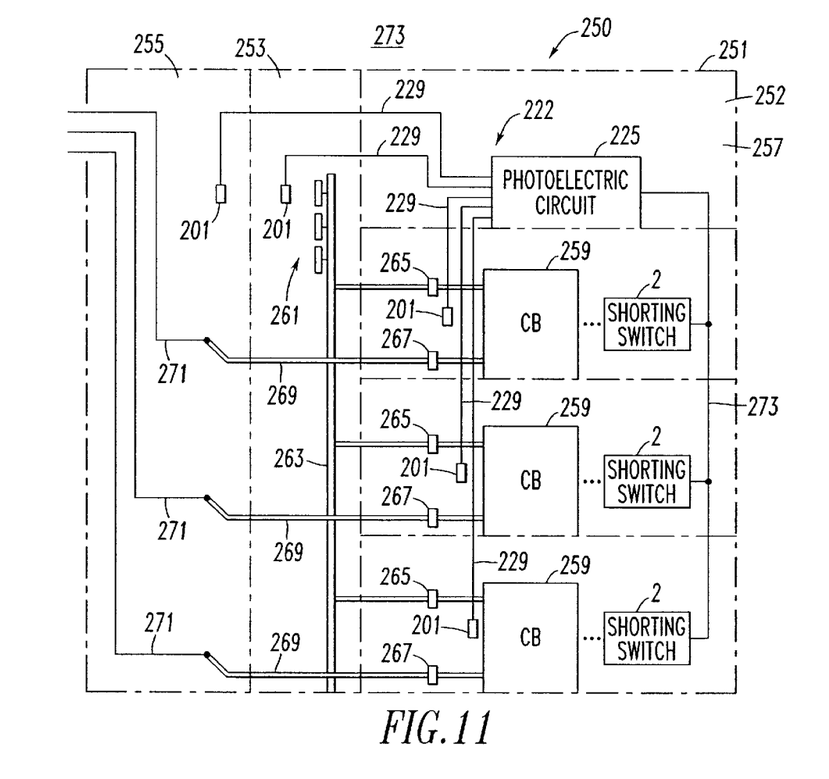
FIG. 11 is a diagram illustrating application of the invention to arc protection in switchgear.

FIG. 11 illustrates schematically an application of the optical arcing fault detector 222 to distribution systems switchgear. The switchgear 250 includes a metal switchgear cabinet 251. Typically, the cabinet 251 is divided into a forward-compartment 252, a middle compartment 253, and a rear compartment 255. The forward compartment 252 is divided vertically into cells 257 in which are housed electrical switching apparatus such as circuit breakers (CBs) 259. The middle compartment 253 houses rigid buses including a horizontal three-phase bus 261 which is connected to a set of vertical buses (only one visible) 263. The vertical buses are connected to the circuit breakers 259 through upper quick disconnects 265. Lower quick disconnects 267 connect the circuit breakers through runbacks 269 to cables 271 extending from the rear compartment 255.

The optical arcing fault detector 222 can be used to protect the switchgear 250 from arcing faults, which can occur between any of the conductors 261–271 or between such conductors and the metal cabinet 251. Thus, sensors 201 can be inserted into the cells 257, the middle compartment 253 and the rear compartment 255 where they can monitor for arcing faults. Each of the sensors 201 is connected by an optic fiber 229 to the photoelectric circuit 225 that can be contained in the top-most cell 257 of the forward compartment 252 or any other convenient location. Upon detection of an arcing fault, the arc signal generated by the photoelectric circuit 225 can be applied as a trigger signal through a trip lead 273 to each of the high-speed shorting switches 2.

Figure 12:
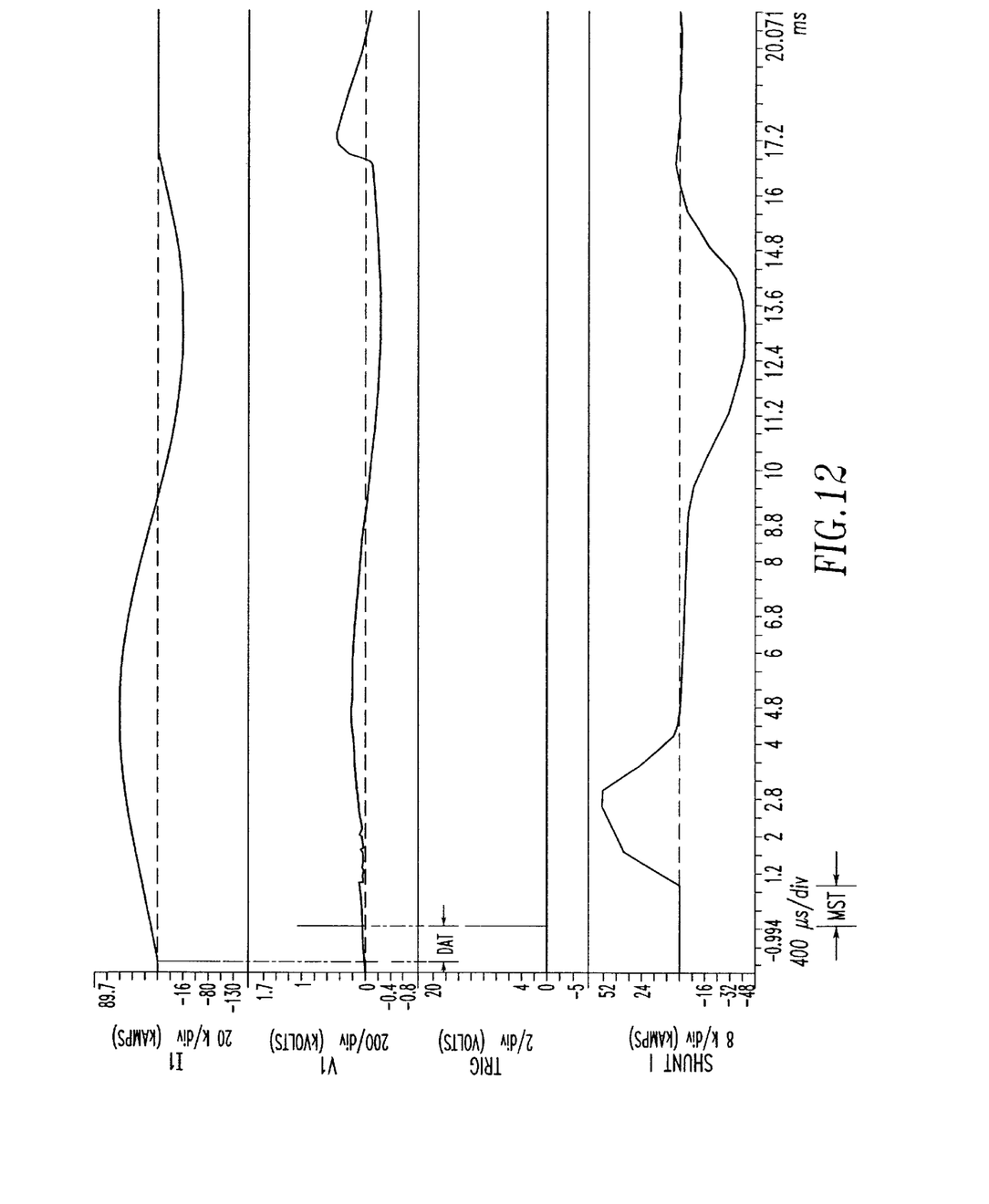
FIG. 12 is a plot of voltage and current waveforms of a test at 500 V/38 kA showing a switching time of about 972 $\mu$s.

FIG. 12 shows a plot of voltage and current waveforms at 500 V/38 kA$_{RMS}$ for the shorting system 140 of FIG. 7 showing a mechanical switching time (MST) of about 972 $\mu$s after the charge 22 is activated. The shorting system 140 can hold the bridging contact 26 and the contacts 28,30 closed at the rated current and voltage. The spring-loaded switch 2 successfully switches in 972 $\mu$s on a 500V/38 kA$_{RMS}$ circuit. This switch 2 and the terminals 32,34 are adapted for electrical connection to a low voltage (e.g., 690 VAC) power system wherein the threat of an arcing fault might occur. The contacts 28,30 and the bridging contact 26 are adapted for operation with a 500 VAC/38 kA$_{RMS}$ power source for the power distribution equipment. The actual closing times depend on the amount of mass being moved and on the spring force being applied. For example, a relatively large moving bridge contact 26 may be employed with a 0.5-inch gap 132 being maintained between the contacts 28,30.

Table 1, below, shows a summary of timing results for the exemplary spring-loaded low voltage shorting switch 2 and shorting system 140 of FIG. 7. The arcing fault detector 222 of FIG. 10 has a detection and activation time (DAT) of about 550 $\mu$s, and the bridging contact 26 has a switching time of about 972 $\mu$s, although as discussed above, the DAT may vary from about 300 $\mu$s to about 2 $\mu$s.

TABLE 1

| Detection and Activation Time (µs) | Mechanical Switch Time (µs) | Total System Operating Time (ms) |
|---|---|---|
| 550 | 972 | ~1.52 |

Various enhancements can be made, for example, to increase the fault current rating. For example, a spring with a relatively larger spring force may be employed in order to suitably provide a better shorting contact. To reduce switching time, corresponding weight reductions of the moving mass (e.g., mass of the bridging contact 26; spring 10; diameter of the release bolt 16; length of the bolt left in the bridging contact 26) may be employed.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A shorting switch for eliminating arcing faults in low voltage power distribution equipment, said shorting switch comprising:

a base supporting a first side and an opposite second side;

a spring having a first end engaging the first side of said base, said spring also having a second end;

a release member having an opening therein, said release member having a first end engaging the first side of said base, said release member also having a second end;

a charge disposed in the opening of said release member, said charge for fracturing said release member;

a bridging contact biased by the second end of said spring toward the second side of said base, the second end of said release member normally maintaining said spring in a compressed state;

two contacts supported by the second side of said base for electrical engagement by said bridging contact after fracture of said release member; and two terminals respectively electrically connected to said two contacts.

2. The shorting switch as recited in claim 1 wherein said spring is a compression spring, which forces said bridging contact to electrically engage said contacts after fracture of said release member.

3. The shorting switch as recited in claim 1 wherein said charge is an electrically activated, chemical charge.

4. The shorting switch as recited in claim 1 wherein said two terminals are adapted for electrical connection to two power lines.

5. The shorting switch as recited in claim 1 wherein said two terminals are adapted for electrical connection to a power line and a ground.

6. The shorting switch as recited in claim 1 wherein said two terminals are adapted for electrical connection to a power line and a neutral.

7. The shorting switch as recited in claim 1 wherein said release member has a longitudinal axis; and wherein the opening of said release member is a longitudinal cavity along said longitudinal axis.

8. The shorting switch as recited in claim 7 wherein said charge is activated to provide a shock wave to fracture said release member; and wherein said release member is a release bolt having a body and a breakline disposed thereon to locate and control fracture of said release bolt responsive to said shock wave.

9. The shorting switch as recited in claim 8 wherein the breakline has a predetermined depth in the body of said release bolt; and wherein said spring has a predetermined compression force, with said release bolt being structured to maintain at least said compression force until after said charge is activated.

10. A shorting switch for eliminating arcing faults in low voltage power distribution equipment, said shorting switch comprising:

a base supporting a first side and an opposite second side;

a spring having a first end engaging the first side of said base, said spring also having a second end;

a release member having an opening therein, said release member having a first end engaging the first side of said base, said release member also having a second end;

a charge disposed in the opening of said release member, said charge for fracturing said release member;

a bridging contact biased by the second end of said spring toward the second side of said base, the second end of said release member engaging said bridging contact to normally maintain said spring in a compressed state;

at least three contacts supported by the second side of said base for electrical engagement by said bridging contact after fracture of said release member; and at least three terminals respectively electrically connected to said at least three contacts.

11. The shorting switch as recited in claim 10 wherein said at least three contacts are four contacts which are disposed for engagement by the bridging contact after fracture of said release member; and wherein said at least three terminals are four terminals which respectively electrically connect to said four contacts.

12. A shorting system for eliminating an arcing fault in low voltage power distribution equipment, said shorting system comprising:

a base supporting a first side and an opposite second side;

a spring having a first end engaging the first side of said base, said spring also having a second end;

a release member having an opening therein, said release member having a first end engaging the first side of said base, said release remember also having a second end;

a charge disposed in the opening of said release member, said charge for fracturing said release member;

a bridging contact biased by the second end of said spring toward the second side of said base, the second end of said release member normally maintaining said spring in a compressed state;

two contacts supported by the second side of said base for electrical engagement by said bridging contact after fracture of said release member;

two terminals respectively electrically connected to said two contacts; and means for detecting an arcing fault and responsively activating the charge disposed in the opening of said release member, in order that said activated charge fractures said release member, which releases said spring, which drives said bridging contact to short across said two contacts to eliminate said arcing fault.

13. The shorting system as recited in claim 12 wherein said contacts have a gap therebetween.

14. The shorting system as recited in claim 13 wherein a solid insulator is disposed within the gap between said contacts.

15. The shorting system as recited in claim 12 wherein said charge includes an electrical input; and wherein said means for detecting an arcing fault and responsively activating the charge comprises means for detecting the arcing fault and responsively outputting a trigger signal, and means for detecting the trigger signal and responsively outputting an activation signal to the electrical input of said charge.

16. The shorting system as recited in claim 15 said charge is an electrically activated, chemical charge.

17. The shorting system as recited in claim 12 wherein said contacts and said bridging contact are adapted for operation with a 500 VAC/38 $kA_{RMS}$ power source for said low voltage power distribution equipment.

18. The shorting system as recited in claim 12 wherein said means for detecting an arcing fault and responsively activating the charge has an activation delay of about 550 $\mu s$ after initiation of an arcing fault event.

19. The shorting system as recited in claim 12 wherein said bridging contact has a switching time of about 972 $\mu s$ after said charge is activated.

20. The shorting system as recited in claim 12 wherein said terminals are adapted for electrical connection to a low voltage power system.

21. The shorting system as recited in claim 20 wherein said low voltage power system is a 690 VAC power system.

* * * * *